(12) United States Patent
Ko et al.

(10) Patent No.: US 11,463,904 B2
(45) Date of Patent: Oct. 4, 2022

(54) METHOD AND APPARATUS FOR SELECTING CARRIER IN MOBILE COMMUNICATION SYSTEM

(71) Applicant: Samsung Electronics Co., Ltd, Suwon-si (KR)

(72) Inventors: Jaeyun Ko, Suwon-si (KR); Seungjoo Maeng, Seongnam-si (KR); Joseph Jeon, Seongnam-si (KR); Dongwook Choi, Seoul (KR); Jungmin Choi, Osan-si (KR); Seunghee Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 324 days.

(21) Appl. No.: 16/489,643

(22) PCT Filed: Feb. 28, 2018

(86) PCT No.: PCT/KR2018/002486
§ 371 (c)(1),
(2) Date: Aug. 28, 2019

(87) PCT Pub. No.: WO2018/160013
PCT Pub. Date: Sep. 7, 2018

(65) Prior Publication Data
US 2021/0282051 A1  Sep. 9, 2021

(30) Foreign Application Priority Data
Feb. 28, 2017  (KR) .................. 10-2017-0026646

(51) Int. Cl.
*H04W 28/02* (2009.01)
*H04W 28/08* (2009.01)

(52) U.S. Cl.
CPC .... *H04W 28/0289* (2013.01); *H04W 28/0808* (2020.05); *H04W 28/0933* (2020.05); *H04W 28/0983* (2020.05)

(58) Field of Classification Search
CPC ......... H04W 28/0289; H04W 28/0933; H04W 28/0808; H04W 28/983
See application file for complete search history.

(56) References Cited

U.S. PATENT DOCUMENTS 8,688,120 B2   4/2014  Song et al.
8,855,696 B2  10/2014  Yang et al.
(Continued)

FOREIGN PATENT DOCUMENTS

KR  10-2010-0082284 A   7/2010
KR  10-2011-0031892 A   3/2011
(Continued)

OTHER PUBLICATIONS

International Search Report dated Jun. 14, 2018 in connection with International Patent Application No. PCT/KR2018/002486, 2 pages.
(Continued)

*Primary Examiner* — Christopher M Crutchfield
*Assistant Examiner* — Tito Q Pham

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for controlling a terminal in a base station of a mobile communication system, according to an (Continued)

embodiment of the present application, comprises the steps of: selecting at least one candidate terminal for offloading; obtaining information on a neighbor cell of at least one of the candidate terminals; obtaining throughput improvement information according to offloading on the basis of information on the candidate terminal and load information of the neighbor cell of the candidate terminal; obtaining information on a target cell corresponding to the candidate terminal on the basis of the throughput improvement information; selecting a target terminal to be offloaded from the candidate terminals on the basis of the throughput improvement information corresponding to the target cell; and transmitting, to the target terminal, a message instructing offloading to the target cell corresponding to the target terminal.

17 Claims, 12 Drawing Sheets

(56) References Cited

U.S. PATENT DOCUMENTS

| | | | |
|---|---|---|---|
| 9,532,281 B2 | 12/2016 | Bontu et al. | |
| 10,172,177 B2 | 1/2019 | Gheorghiu et al. | |
| 2006/0142021 A1* | 6/2006 | Mueckenheim | H04W 36/22 455/453 |
| 2009/0270104 A1* | 10/2009 | Du | H04W 48/02 455/436 |
| 2009/0285174 A1* | 11/2009 | Haga | H04L 1/0041 370/331 |
| 2013/0183972 A1* | 7/2013 | Li | H04W 36/0005 455/436 |
| 2013/0303170 A1* | 11/2013 | Siomina | G01S 5/0236 455/436 |
| 2014/0155070 A1* | 6/2014 | Ljung | H04W 48/12 455/438 |
| 2014/0364129 A1* | 12/2014 | Xiao | H04W 36/04 455/444 |
| 2015/0111575 A1* | 4/2015 | Lei | H04W 28/08 455/436 |
| 2015/0141014 A1* | 5/2015 | Huang | H04W 36/00835 455/436 |
| 2015/0146686 A1* | 5/2015 | Huang | H04W 36/0072 370/331 |
| 2015/0341945 A1 | 11/2015 | Panchal | |
| 2015/0358863 A1* | 12/2015 | Yamamoto | H04W 72/08 370/329 |
| 2015/0373614 A1* | 12/2015 | Tie | H04W 76/27 455/437 |
| 2016/0143035 A1 | 5/2016 | Xue et al. | |
| 2016/0192239 A1* | 6/2016 | Salvador | H04W 28/0268 370/331 |
| 2016/0353340 A1* | 12/2016 | Yang | H04W 36/0058 |
| 2017/0070923 A1* | 3/2017 | Li | H04W 36/0066 |
| 2017/0289889 A1* | 10/2017 | Sahu | H04L 5/0098 |
| 2018/0248613 A1* | 8/2018 | Peitzer | H04B 17/12 |

FOREIGN PATENT DOCUMENTS

| | | |
|---|---|---|
| KR | 10-2015-0144320 A | 12/2015 |
| KR | 10-2016-0040631 A | 4/2016 |

OTHER PUBLICATIONS

Written Opinion of the International Searching Authority dated Jun. 14, 2018 in connection with International Patent Application No. PCT/KR2018/002486, 5 pages.

* cited by examiner

METHOD AND APPARATUS FOR SELECTING CARRIER IN MOBILE COMMUNICATION SYSTEM

CROSS-REFERENCE TO RELATED APPLICATIONS

This application is a 371 of International Application No. PCT/KR2018/002486 filed on Feb. 28, 2018, which claims priority to Korean Patent Application No. 10-2017-0026646 filed on Feb. 28, 2017, the disclosures of which are herein incorporated by reference in their entirety.

BACKGROUND

1. Field

Embodiments of the disclosure relate to a method and apparatus for carrier selection in a mobile communication system. More particularly, embodiments of the disclosure relate to a method and apparatus for carrier selection that can resolve the overload situation based on user perceived performance improvement when an overload occurs in a communication system supporting carrier aggregation (CA).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Such a mobile communication system can transmit and receive signals using carrier aggregation (CA). The use of CA enables a greater amount of data transmission. However, if a carrier used in CA is overloaded, it is necessary to select another carrier. Hence, there is a need for a method and apparatus for selecting a suitable carrier to improve the system performance.

The disclosure has been made in view of the above problem. Accordingly, an embodiment of the disclosure is to provide a method and apparatus that, when a specific carrier is overloaded in a communication system supporting carrier aggregation, can move a terminal using the overloaded carrier to another carrier. In addition, an embodiment of the disclosure is to provide a carrier selection method that can improve the user perceived performance when a carrier is overloaded, and an apparatus supporting the carrier selection method.

SUMMARY

According to an embodiment of the disclosure, there is provided a method for a base station to control terminals in a mobile communication system. The method may include: selecting one or more candidate terminals for offloading; obtaining information about neighbor cells of at least one candidate terminal among the one or more candidate terminals; obtaining information about throughput improvement due to offloading based on the candidate terminal information and the load information of the neighbor cell of the candidate terminal; obtaining information about a target cell corresponding to the candidate terminal based on the throughput improvement information; selecting a target terminal to be offloaded among the candidate terminals based on the throughput improvement information corresponding to the target cell; and transmitting a message indicating offloading to a target cell corresponding to the target terminal to the target terminal.

According to an embodiment of the disclosure, there is provided a base station in a mobile communication system. The base station may include: a transceiver configured to transmit and receive a signal; and a controller configured to control the transceiver, select one or more candidate terminals for offloading, obtain information about neighbor cells of at least one candidate terminal among the one or more candidate terminals, obtain information about throughput improvement due to offloading based on the candidate terminal information and the load information of the neighbor cell of the candidate terminal, obtain information about a target cell corresponding to the candidate terminal based on the throughput improvement information, select a target terminal to be offloaded among the candidate terminals based on the throughput improvement information corresponding to the target cell, and transmit a message indicating offloading to a target cell corresponding to the target terminal to the target terminal.

According to an embodiment of the disclosure, when a specific carrier is overloaded, the terminal using the overloaded carrier may select another carrier with a large improvement in user perceived performance, thereby improving user convenience. Further, communication resources can be efficiently utilized by selecting a carrier based on the overall system throughput.

DETAILED DESCRIPTION

Figure 1:
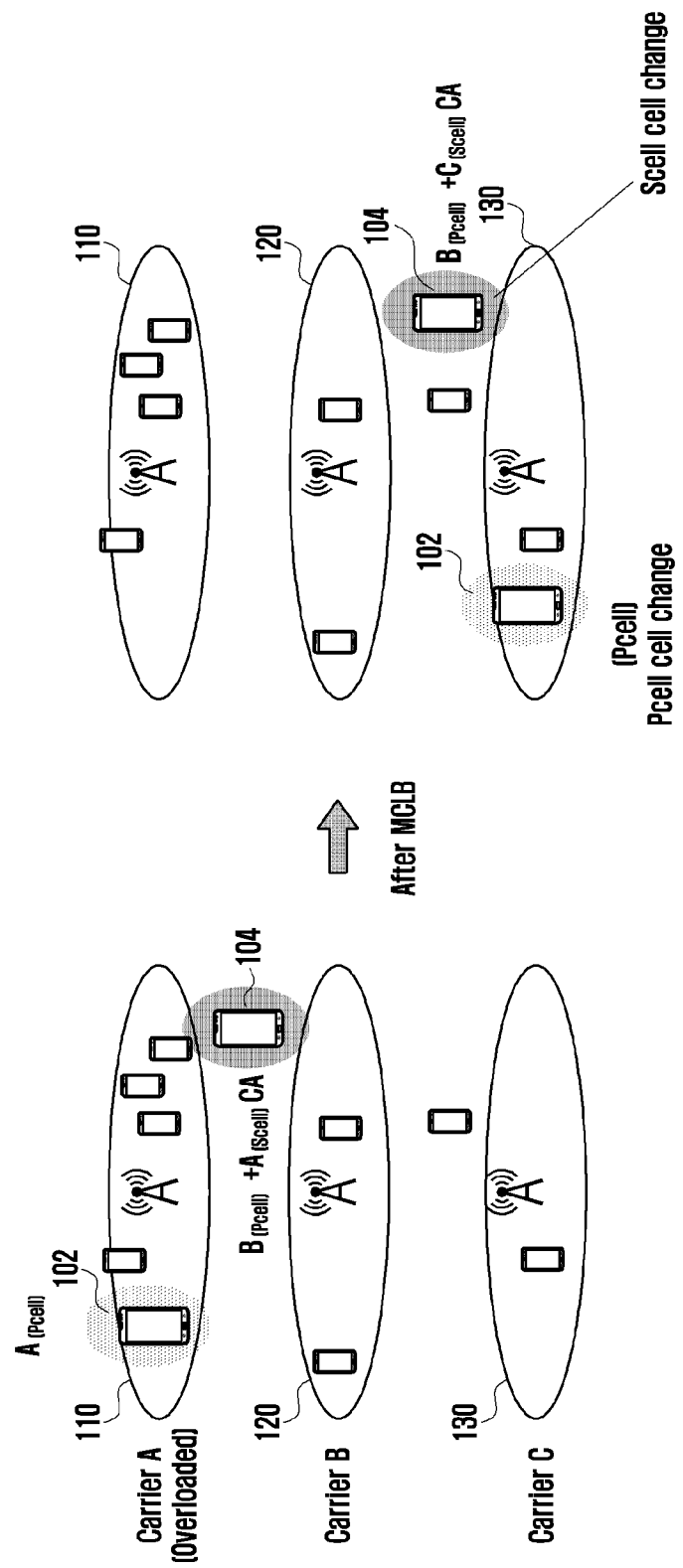
FIG. 1 depicts carrier change for load balancing according to an embodiment of the disclosure.

Hereinafter, embodiments of the disclosure are described in detail with reference to the accompanying drawings.

Descriptions of functions and structures well known in the art and not directly related to the disclosure may be omitted for clarity and conciseness without obscuring the subject matter of the disclosure.

In the drawings, some elements are exaggerated, omitted, or only outlined in brief, and thus may be not drawn to scale. The same or similar reference symbols are used throughout the drawings to refer to the same or like parts.

The aspects, features, and advantages of certain embodiments of the disclosure will be more apparent from the following detailed description taken in conjunction with the accompanying drawings. The description of the various embodiments is to be construed as exemplary only and does not describe every possible instance of the disclosure. It should be apparent to those skilled in the art that the following description of various embodiments of the disclosure is provided for illustrative purposes only and not for the purpose of limiting the disclosure as defined by the appended claims and their equivalents. The same reference symbols are used throughout the description to refer to the same parts.

Meanwhile, it is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. As the computer program instructions may be stored in a computer readable memory that is usable in a specialized computer or a programmable data processing equipment, it is also possible to create articles of manufacture that carry out functions described in the flowchart. As the computer program instructions may be loaded on a computer or a programmable data processing equipment, when executed as processes, they may carry out steps of functions described in the flowchart.

A block of a flowchart may correspond to a module, a segment or a code containing one or more executable instructions implementing one or more logical functions, or to a part thereof. In some cases, functions described by blocks may be executed in an order different from the listed order. For example, two blocks listed in sequence may be executed at the same time or executed in reverse order.

In the description, the word "unit", "module", or the like may refer to a software component or hardware component such as an FPGA or ASIC capable of carrying out a function or an operation. However, "unit" or the like is not limited to hardware or software. A unit or the like may be configured so as to reside in an addressable storage medium or to drive one or more processors. Units or the like may refer to software components, object-oriented software components, class components, task components, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose large components and units. Components and units may be configured to drive a device or one or more processors in a secure multimedia card.

In one embodiment, the base station periodically monitors the load status of the cells. If an overloaded cell is found (e.g., the occupancy ratio of physical resource blocks (PRB) is higher than a given level), the base station may select some of the terminals in the overloaded cell and request the selected terminals to send a measurement report (MR). Here, the base station may select a terminal that uses the overload cell as a secondary cell (Scell), and may also select a terminal that uses the overloaded cell as a primary cell (Pcell) according to an embodiment.

The base station requests the selected terminal to send an MR and receives the MR. The MR may include signal strength information of the cell having the largest signal strength for each neighbor frequency. Thereafter, the base station may select at least one of a terminal to be offloaded, or a target frequency or a target cell to be newly assigned after the terminal is offloaded based on the obtained information, and perform offloading accordingly. Here, the terminal to be offloaded and the target cell can be selected according to at least one of the following schemes.

Cell load based allocation: a terminal in the cell having the smallest cell load among the cells indicated by the MR is selected and the cell having the smallest cell load is selected as the target cell of the selected terminal. As a cell with a low cell load has a lot of free resources, it is highly possible for the cell to allocate a large amount of resources to a new user, providing high throughput.

Signal strength based allocation: a terminal in the cell having the strongest signal strength among the cells indicated by the MR is selected and the cell having the strongest signal strength is selected as the target cell. Carriers with strong signal strength are likely to achieve high throughput.

In addition, recently developed terminals may support the CA technology enabling data transmission and reception through plural carriers at the same time. For such a terminal, there is an increasing need to select the target cell in consideration of both the Pcell and the Scell.

An embodiment of the disclosure proposes a carrier allocation method for maximizing the user perceived quality. The proposed method selects the carrier maximizing the perceived quality in consideration of both the cell load for each frequency and the expected throughput that the terminal can obtain at each frequency. In the proposed method, an optimal target cell can be selected for a terminal supporting CA by considering both the Pcell and the Scell allocated to the terminal.

FIG. 1 depicts carrier change for load balancing according to an embodiment of the disclosure.

For example, with reference to FIG. 1, terminals can receive signals through carrier A (110), carrier B (120), and carrier C (130). These carriers may be operated by the same base station or by different base stations, and only some of the carriers may be operated by the same base station.

Terminal 1 (102) transmits and receives signals through carrier A (110), and terminal 2 (104) can transmit and receive a signal through CA where carrier B (120) is used as the PCell and carrier A (110) is used as the SCell. Here, carrier A (110) can be overloaded with an increase in signal transmission and reception amount. In this case, multi-carrier load balancing (MCLB) may be performed to move the terminal receiving a signal through overloaded carrier A (110) to another carrier. More specifically, load balancing may be performed to cause the terminal using carrier A (110) as the PCell or the terminal using carrier A (110) as the SCell to use a different carrier.

In this example, as a result of MCLB, a PCell change is applied to terminal 1 (102) so that terminal 1 (102) uses carrier C (130) as the PCell; and a SCell change is applied to terminal 2 (104) so that terminal 2 (104) maintains carrier B (120) as the PCell and uses carrier C (130) as the SCell.

As described above, to perform MCLB, it is necessary to consider the terminal and the carrier to which MCLB is to be applied. For MCLB, it is necessary to select a terminal and a carrier so that the performance improvement perceived by the user of the terminal transmitting and receiving a signal through the overloaded carrier can be large.

Figure 2:
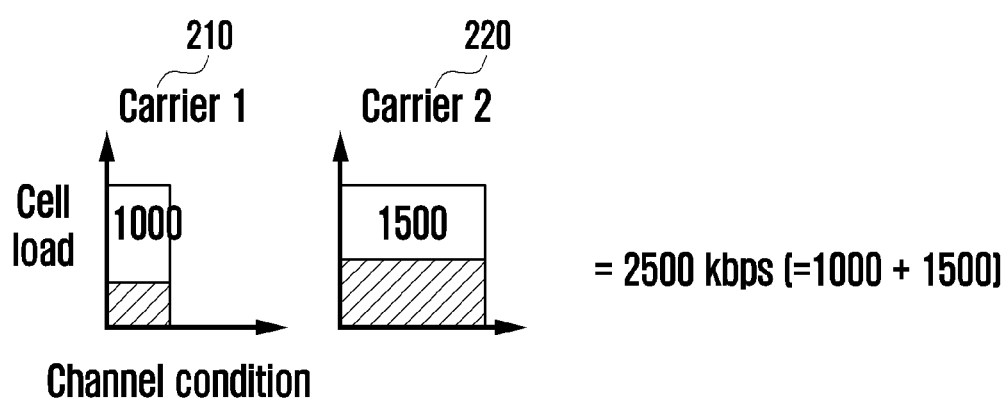
FIG. 2 illustrates bandwidth usage according to an embodiment of the disclosure.

FIG. 2 illustrates bandwidth usage according to an embodiment of the disclosure.

In FIG. 2, the hatched portion represents the occupied channel capacity of carrier 1 (210) and carrier 2 (220). Here, the remaining channel capacity may be determined according to the unused bandwidth and the channel condition of the corresponding bandwidth. Even if a wide bandwidth is available, the amount of transmission can be reduced if the channel condition is poor.

In FIG. 2, the available bandwidth of carrier 1 (210) may be represented as 1000 kbps, and the available bandwidth of carrier 2 (220) may be represented as 1500 kbps. In this way, the sum of the bandwidths of carrier 1 (210) and carrier 2 (220) can be determined to be 2500 kbps. If there are many unused resource blocks and the data rate considering the channel condition of the resource block is high, the user using the corresponding carrier can easily transmit and receive a signal. Hence, when such a carrier is selected, the user perceived performance can be improved.

Figure 3:
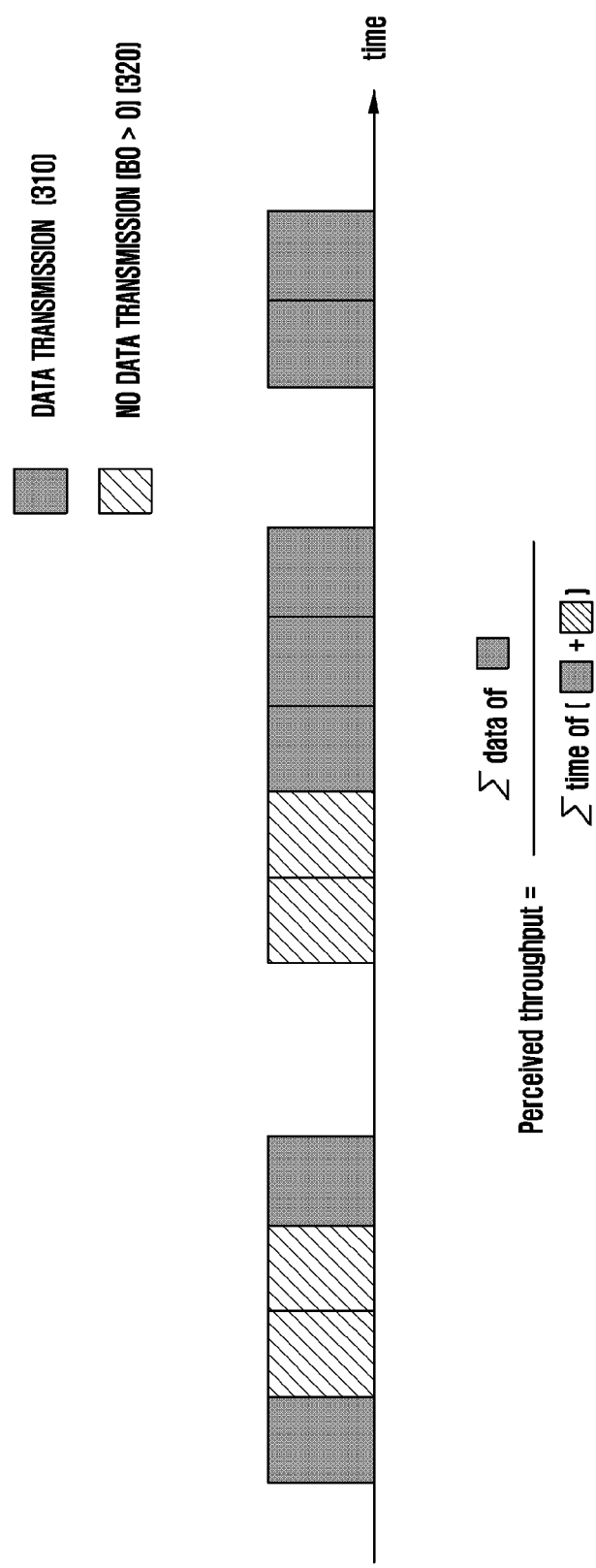
FIG. 3 illustrates perceived throughput based on data transmission of the terminal according to an embodiment of the disclosure.

FIG. 3 illustrates perceived throughput based on data transmission of the terminal according to an embodiment of the disclosure.

With reference to FIG. 3, the terminal can perform data transmission in a region corresponding to the dark-shaded block 310 and can wait for data transmission of another terminal in a region corresponding to the hatched block 320. If the waiting time for another terminal to transmit and receive data in the RBs of the carrier increases, the user perceived throughput can be reduced. The user perceived throughput may be a factor of the user perceived performance.

Here, the user perceived throughput can be represented as a value obtained by dividing the total amount of transmitted data by the sum of the time taken for data transmission and the time spent waiting for data transmission. When a large amount of data is transmitted in a short time, the user perceived throughput can be improved. If there are many users on a particular carrier, the user perceived throughput may be reduced as the waiting time for data transmission corresponding to the hatched block 320 increases.

Figure 4:
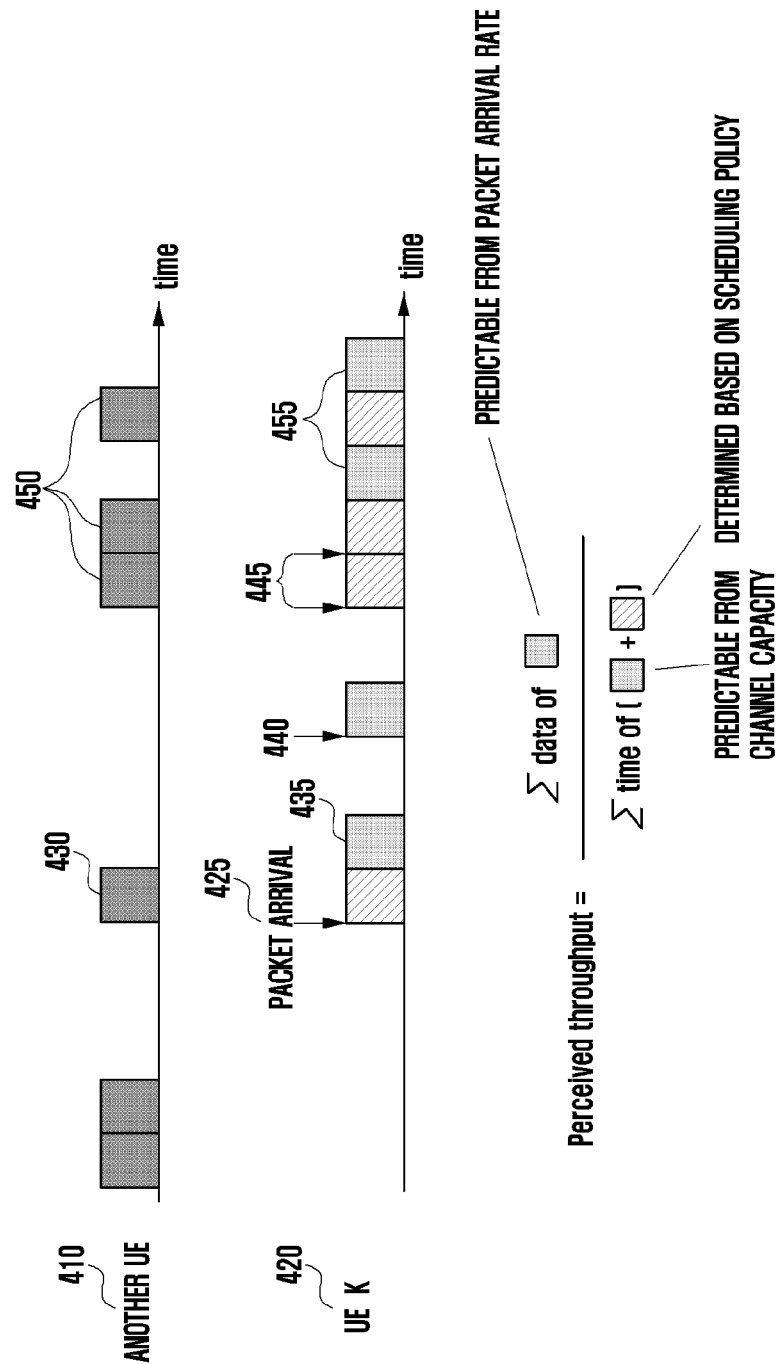
FIG. 4 illustrates perceived throughput in consideration of data transmission of another terminal according to an embodiment of the disclosure.

FIG. 4 illustrates perceived throughput in consideration of data transmission of another terminal according to an embodiment of the disclosure.

FIG. 4 shows a data transmission scheme for a case where a different terminal 410 has a scheduling advantage over terminal K (420).

Although a data packet for terminal K (420) is generated at the time indicated by indicia 425, as data of the terminal 410 is being transmitted as indicated by indicia 430, terminal K (420) may wait for data transmission at the time indicated by indicia 425 and receive data at the time indicated by indicia 435.

When a data packet for terminal K (420) is generated at the time indicated by indicia 440, as data of the terminal 410 is not transmitted at that time, terminal K (420) may receive data at the time indicated by indicia 440.

As the terminal 410 receives data at the time indicated by indicia 450, although there is data to be transmitted to terminal K (420) at the time indicated by indicia 445, terminal K (420) must wait and then may receive data at the time indicated by indicia 445.

In this way, the perceived throughput for terminal K (420) may be represented as a value obtained by dividing the total amount of data transmitted to terminal K (420) by the sum of the time taken for data transmission and the time for terminal K (420) to wait for data transmission.

Here, the total amount of data transmitted to terminal K (420) may be predicted based on the packet arrival rate for terminal K (420). The time taken by terminal K (420) for data transmission may be predicted based on the capacity of the channel used by terminal K (420), and the time for terminal K (420) to wait for data reception may be predicted based on the scheduling policy applied to each terminal.

Hence, it is possible to determine or predict the perceived throughput for terminal K (420). When the packet arrival rate for terminal K (420) is the same, the perceived performance change experienced by terminal K (420) may be determined by comparing the channel capacity and scheduling policy of the carrier currently used by terminal K (420) with the channel capacity and scheduling policy of the carrier to which terminal K (420) is to be moved.

Figure 5:
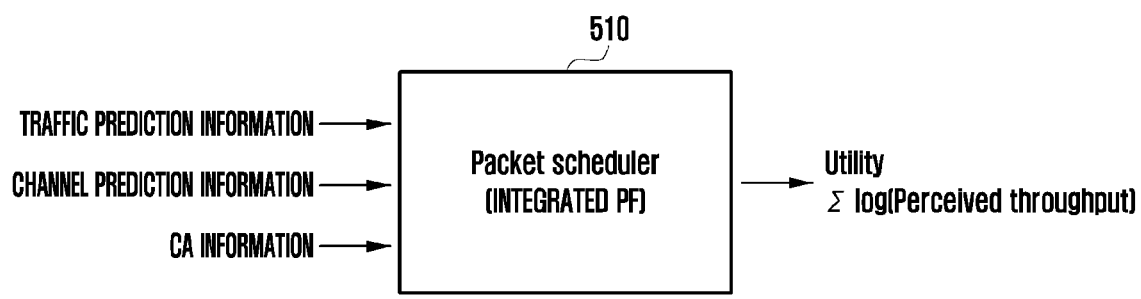
FIG. 5 illustrates scheduler operation for improving the perceived performance according to an embodiment of the disclosure.

FIG. 5 illustrates scheduler operation for improving the perceived performance according to an embodiment of the disclosure.

With reference to FIG. 5, the packet scheduler 510 may maximize the user perceived performance improvement based on the provided information.

Here, the packet scheduler 510 may be an integrated proportional fair (PF) scheduler.

The packet scheduler 510 may select a carrier to be used by a specific terminal based on traffic prediction information, channel prediction information, and carrier aggregation information so as to optimally improve the perceived performance.

More specifically, based on the current load information for each carrier, when a specific carrier is overloaded, the packet scheduler 510 may determine a terminal that may bring optimal performance improvement if it is moved to another carrier among the terminals related to the overloaded carrier. Here, the packet scheduler 510 may select a terminal occupying the most bandwidth of the overloaded carrier for movement, and the target carrier to be used by the terminal may be a carrier with the largest idle bandwidth among the carriers adjacent to the terminal.

In this case, the number of packet arrivals per unit time may be assumed to follow the Poisson distribution, and the sum of two independent Poisson random variables still follows the Poisson distribution. Also, assuming that the event occurrence in a unit interval is independent of the event occurrence in another unit interval, and that the packet arrival of the previous interval does not affect the packet arrival of the current interval, the perceived throughput can be predicted.

Figure 6:
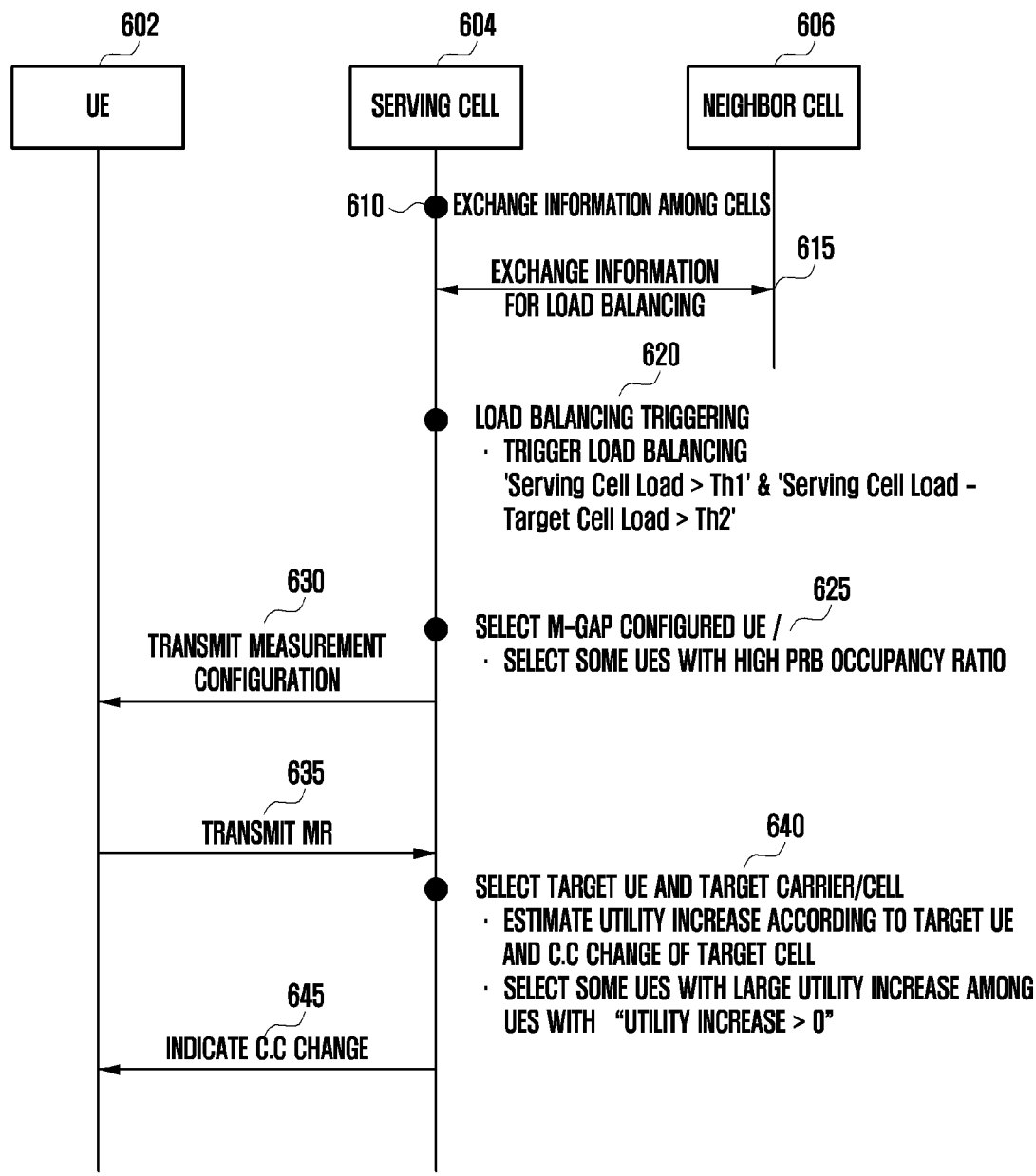
FIG. 6 depicts a load balancing method according to an embodiment of the disclosure.

FIG. 6 depicts a load balancing method according to an embodiment of the disclosure.

With reference to FIG. 6, the terminal 602 may transmit and receive data to and from the serving cell 604, and a neighbor cell 606 may be adjacently located.

At step 610, the serving cell 604 may exchange inter-cell information with the neighbor cell 606. More specifically, at step 615, the serving cell 604 may exchange information necessary for load balancing with the neighbor cell 606. The information required for load balancing may include information regarding the current channel occupancy, and the number of terminals transmitting and receiving a signal. Scheduling information may enable calculation of the perceived performance improvement.

At step 620, the serving cell 604 may determine whether to perform an operation for load balancing. In one embodiment, the operation for load balancing may be performed by determining whether a preset condition is satisfied. Specifically, if the serving cell load is higher than or equal to a first threshold and if the difference between the serving cell load and the target cell load is greater than or equal to a second threshold, the operation for load balancing may be performed. Here, the above conditions are exemplary and the above conditions may be evaluated independently.

At step 625, the serving cell 604 may select a terminal to collect measurement information for load balancing. More specifically, as the load due to control signaling may increase when plural terminals are moved, measurement information may be requested for some selected terminals. In this case, the serving cell 604 may select a terminal with a high PRB occupancy level. For example, the serving cell 604 may select a terminal that can lower the serving cell load to a preset value or less if the terminal is moved among the terminals with a high PRB occupancy level.

At step 630, the serving cell 604 may transmit a measurement report request message including measurement configuration information to the selected terminal 602.

At step 635, the serving cell 604 may receive a measurement report message generated in response to the measurement report request message from the terminal 602. The serving cell 604 may also transmit a measurement report request message to a different terminal (not shown). The measurement information may include information on the cells accessible by the terminal 602, and the serving cell 604 may determine the cell to which the terminal 602 is to be moved based on the measurement information and the information exchanged at step 615.

At step 640, the serving cell 604 may select a terminal to be moved and a target cell based on the received information. Specifically, the serving cell 604 may select some of the terminals with perceived performance improvement based on the information obtained at steps 615 and 635.

At step 645, the serving cell 604 may transmit a message indicating a cell change to the terminal 602. Then, the terminal 602 may transmit and receive a signal through the cell indicated by the serving cell 604, and thus the perceived performance may be improved.

Figure 7:
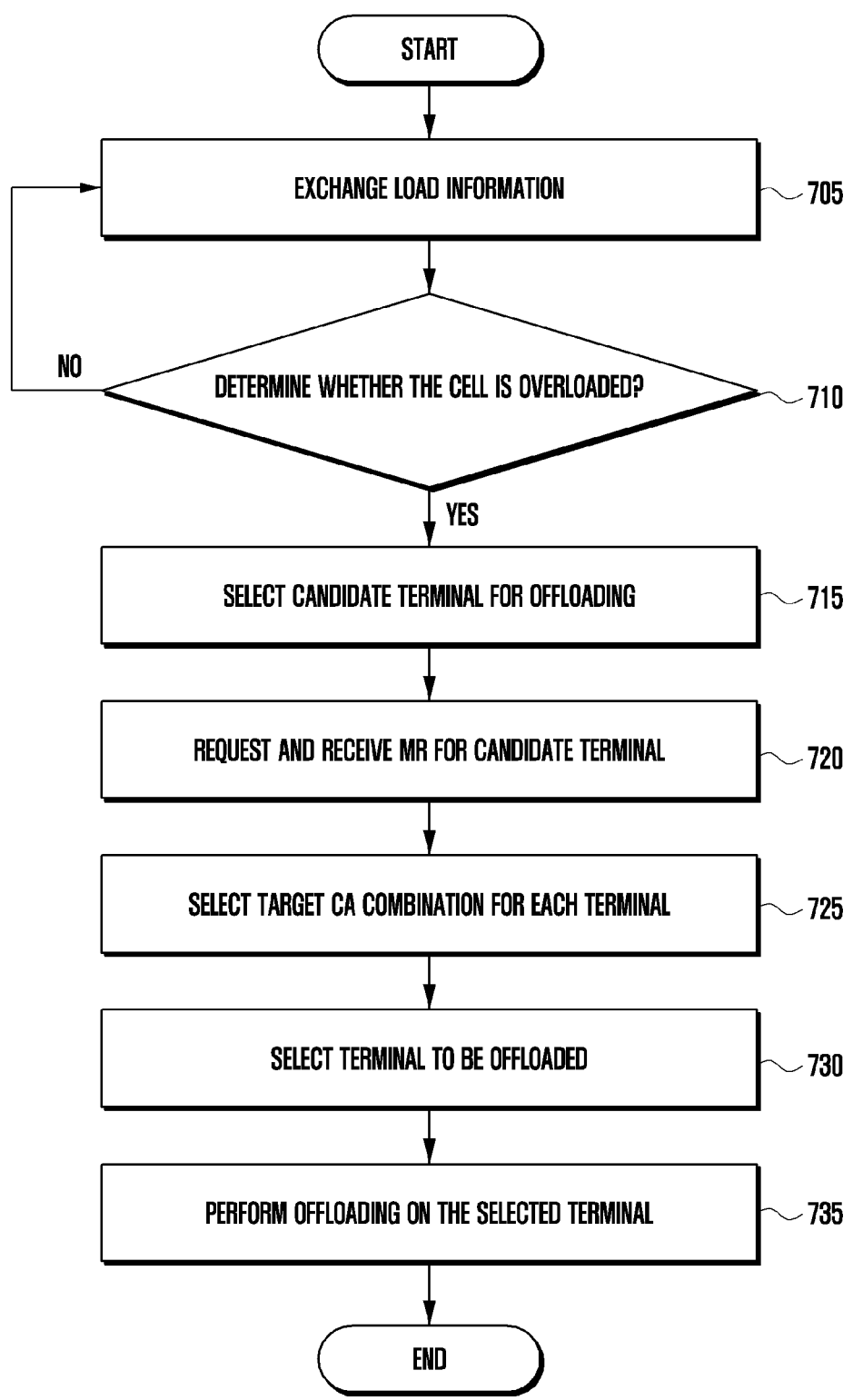
FIG. 7 depicts an overload handling operation of the base station for load balancing according to an embodiment of the disclosure.

FIG. 7 depicts an overload handling operation of the base station for load balancing according to an embodiment of the disclosure.

At step 705, the serving cell may exchange load information with another base station. Specifically, each cell may exchange cell load information (e.g., sum of PRB occupancy ratios) with another cell. Such information may be used later for target cell selection.

At step 710, the serving cell may determine whether it is overloaded. More specifically, the serving cell may determine that it is overloaded if the load is greater than or equal to a preset value, and may perform an offloading related operation described later.

At step 715, the serving cell may select a candidate terminal to be offloaded. More specifically, upon determining that offloading is necessary, the serving cell may select a candidate terminal to be offloaded. For example, the serving cell may select a given number of terminals in order of PRB occupancy ratio from highest. Offloading a terminal with a small PRB occupancy ratio does not help greatly in overload resolution and may increase unnecessary control signaling. In consideration of this, it is preferable to select a terminal having a high PRB occupancy ratio.

At step 720, the serving cell may transmit a measurement information request to the terminal selected as the candidate terminal at step 715 and receive the corresponding measurement information. In one embodiment, the terminals to which the measurement information request is sent may include a terminal using the serving cell as the SCell. For a specific terminal using the serving cell as the SCell, a request for measurement information related to the specific terminal may be sent to the base station corresponding to the PCell of the specific terminal. More specifically, the serving cell may send a request for information needed for offloading calculation to the base station corresponding to the PCell, and receive the requested information from the base station corresponding to the PCell. In one embodiment, the serving cell may receive a request for measurement information from a terminal using the serving cell as the PCell. The information received from the terminal may include at least one of PCell related information or neighbor cell information. When the terminal is in CA, the PRB occupancy information on the PRBs of the SCell occupied by the terminal may be received from the SCell of the terminal.

At step 725, the serving cell may determine the information on the target CA combination for each terminal based on at least one of the information obtained at step 705 or the information obtained at step 720. More specifically, the serving cell may select an optimal CA combination for the corresponding terminal based on the following metric value for each CA combination not including the serving cell. In the following equation, metric (k) may indicate the rate of increase in the perceived throughput due to a component carrier change for terminal k.

$$\text{metric}(k) = \frac{perceivedTput_{new}(k) - perceivedTput_{old}(k)}{perceivedTput_{old}(k)}$$

PerceivedTput$_{old}$(k)=
$\Sigma_{m:\ old\ component\ carrier\ of\ UE\ k}\{(1-\text{sum}Prb_m + prb_m(k)) \times \text{chRate}_k(k)\}$ PerceivedTput$_{new}$(k)=
$\Sigma_{m:\ new\ component\ carrier\ of\ UE\ k}\{(1-\text{sum}Prb_m + prb_m(k)) \times \text{chRate}_k(k)\}$ For UE k, the perceived throughput may be defined as above.

Here, sumPrb$_m$ indicates the total PRB occupancy ratio of cell m received at step 705, prb$_m$ (k) indicates the PRB occupancy ratio of terminal k in cell m. For the Scell, the corresponding information may be obtained at step 720. chRate$_m$ (k) indicates the data rate that can be obtained when terminal k occupies time and frequency resources of cell m, and may include information obtained through the MR received from the terminal at step 720. Based on this, it is possible to obtain information regarding a terminal with improved perceived performance compared to the current perceived performance and a carrier corresponding thereto.

At step 730, the serving cell may select some of the terminals having a metric value greater than zero based on the information obtained at step 725. For example, it is possible to select a number of terminals that can resolve the overload.

At step 735, the serving cell may perform offloading on the selected terminal. When the selected terminal is using the serving cell as the PCell, the serving cell may transmit a message indicating a cell change to the selected terminal. When the selected terminal is using the serving cell as the SCell, the serving cell may transmit a message indicating terminal offloading to the PCell of the selected terminal.

Figure 8:
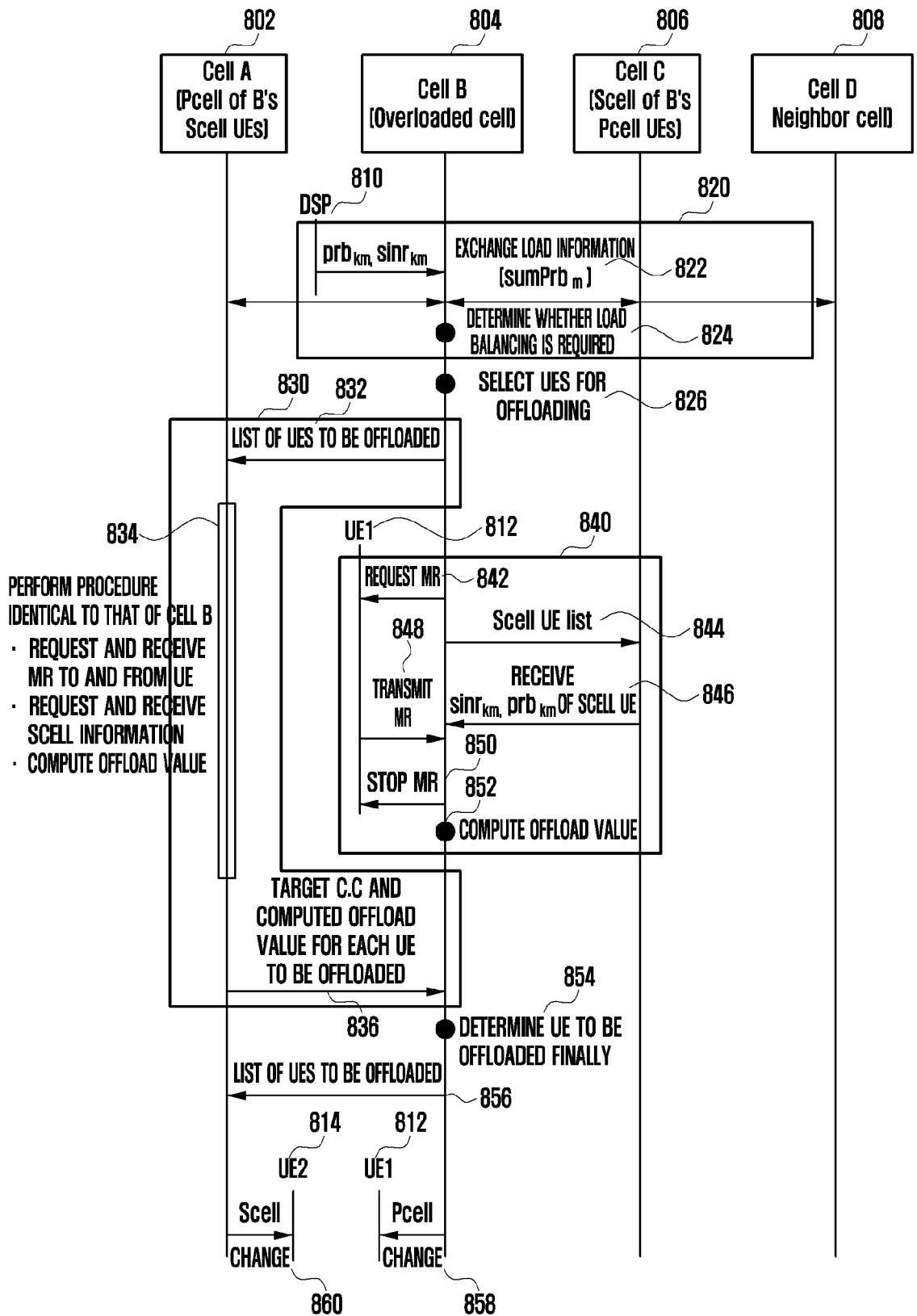
FIG. 8 depicts a method of signal exchange between the base station and the terminal for load balancing according to an embodiment of the disclosure.

FIG. 8 depicts a method of signal exchange between the base station and the terminal for load balancing according to an embodiment of the disclosure.

FIG. 8 illustrates a method of selecting a terminal from an overloaded cell and moving the selected terminal to another cell.

In FIG. 8, cell A (802), cell B (804), cell C (806), and cell D (808) may be deployed, and the cells may exchange information through the x2 interface or the like. Assuming that cell B (804) is overloaded, cell A (802) may be the PCell of a terminal using cell B (804) as the SCell, and cell C (806) may be the SCell of a terminal using cell B (804) as the PCell.

At step 810, cell B (804) may receive at least one of prb$_{k,m}$ or sinr$_{k,m}$ from the DSP of cell B (804). Here, prb$_{k,m}$ may represent the PRB occupancy ratio for terminal k in cell m, and sinr$_{k,m}$ may represent the average SINR for terminal k in cell m.

At step 822, the cells can exchange load information. Here, the load information may include sumPrb$_m$ indicating the sum of PRB utilization for cell m. The sum of PRB utilization may include non-UE specific PRB occupancy information.

At step 824, cell B (804) may check the load level to determine whether load balancing is required. More specifically, the cell B (804) may determine that it is overloaded if the cell load is greater than or equal to a preset value. Then, the cell B (804) may perform an offloading operation to be described later.

Procedure 820 including steps 822 and 824 may be performed periodically.

At step 826, cell B (804) may select a terminal to be offloaded. More specifically, upon determining that offloading is necessary, cell B (804) may select a candidate terminal to be offloaded. For example, cell B (804) may select a given number of terminals in order of PRB occupancy ratio from highest in cell B (804). In one embodiment, the maximum number of candidate terminals may be set, and this maximum number may be set so as to reduce the signaling load.

Procedure 830 describes operations related to a terminal using cell A (802) and cell B (804) as the SCell and using cell A (802) as the PCell.

At step 832, among the terminals selected at step 826, cell B (804) may transmit cell A (802) information on the terminals using cell B (804) as the SCell and using cell A (802) as the PCell. More specifically, to receive measurement information for a terminal using cell B (804) as the SCell and using cell A (802) as the PCell, signaling between cell A (802) and the terminal is required. Hence, cell B (804) may transmit the corresponding information to cell A (802) and request a response thereto.

At step 834, for a terminal using cell B (804) as the SCell among the terminals using cell A (802) as the PCell, cell A (802) may perform operations corresponding to those described later in procedure 840. Accordingly, cell A (802) may send a request for measurement report information to the terminal to receive measurement report information, receive corresponding SCell information, and obtain information about the validity of offloading.

At step 836, cell A (802) may transmit at least one of the information items obtained at step 834 to cell B (804).

Procedure 840 describes operations related to a terminal using cell B (804) as the PCell and using cell C (806) as the SCell. The order of operations included in procedure 840 may vary depending on the embodiment.

At step 842, cell B (804) may transmit a measurement information request to terminal 1 (812) using cell B (804) as the PCell.

At step 844, among the terminals selected at step 826, cell B (804) may transmit cell C (806) information about terminals using cell C (806) as the SCell.

At step 846, cell B (804) may receive at least one of prb$_{k,m}$ information or sinr$_{k,m}$ information for the terminals as a response from cell C (806).

At step 848, cell B (804) may receive measurement report information from terminal 1 (812). At step 850, cell B (804) may send an MR stop request message to terminal 1 (812).

At step 852, cell B (804) may evaluate the offloading validity based on the received information. More specifically, it is possible to identify the perceived performance improvement obtained by moving a specific terminal to a certain cell, and the validity can be evaluated based on this. Here, from among all the CA combinations supported by the terminal, CA combinations that cannot be supported by the operator network may be excluded. From among the corresponding CA combinations, the CA combination including the source cell to be offloaded may be excluded. From among the corresponding CA combinations, a CA combination including a target PCell to be newly added with a load level greater than a threshold value may be excluded for selection. In one embodiment, to determine the target cell, the cell having the largest RSRP may be selected from among the cells reported by the corresponding target PCell.

At step 854, cell B (804) may finally determine a terminal to be offloaded based on at least one of the information received at step 836 and the information obtained at step 852. For this, the cell may consider the following information. In the case of a PCell change, the signaling load and the delay due to the change are large. Hence, a high priority can be given to a combination of changing only the SCell. Based on this, it is possible to determine a terminal having a large perceived performance improvement and cell information used by the terminal.

Here, if terminal 2 (814) using cell B (804) as the SCell and using cell A (802) as the PCell is selected as the terminal to be offloaded, at step 856, cell B (804) may transmit cell A (802) information about terminal 2 (814) and the cell to which terminal 2 (814) is to be changed. At step 860, based on the received information, cell A (802) may transmit a message indicating a SCell change to terminal 2 (814).

In addition, if terminal 1 (812) using cell B (804) as the PCell is selected as the terminal to be offloaded, at step 858, cell B (804) may transmit information for changing the PCell to terminal 1 (812). The information for changing the PCell may include target cell information determined based on the information obtained at steps 852 and 836.

Figure 9:
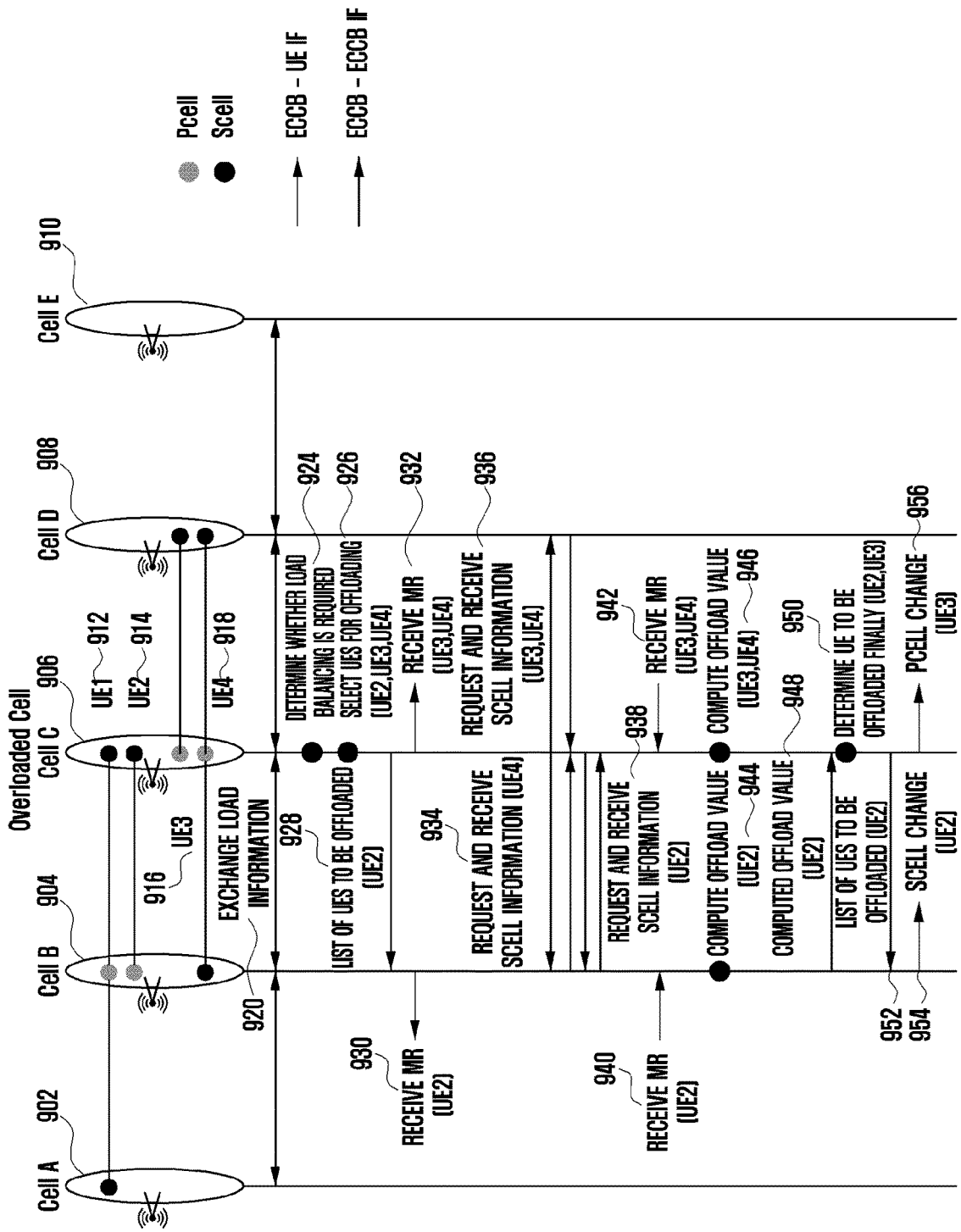
FIG. 9 depicts another method of signal exchange between the base station and the terminal for load balancing according to an embodiment of the disclosure.

FIG. 9 depicts another method of signal exchange between the base station and the terminal for load balancing according to an embodiment of the disclosure.

In FIG. 9, cells A to E (902, 904, 906, 908 and 910) and terminals 1 to 4 (912, 914, 916 and 918) may transmit and receive signals.

Terminal 1 (912) is in CA using cell B (904) as the PCell and using cell A (902) and cell C (906) as the SCell. Terminal 2 (914) is in CA using cell B (904) as the PCell and using cell C (906) as the SCell. Terminal 3 (916) is in CA using cell C (906) as the PCell and using cell D (908) as the SCell. Terminal 4 (918) is in CA using cell C (906) as the PCell and using cell B (904) and cell D (908) as the SCell.

At step 920, cells A to E (902, 904, 906, 908 and 910) may exchange their load information. The load information may include information about the PRB occupancy ratio. Here, if the ratio of the occupied PRBs is high, this may mean a higher load.

In one embodiment, cell C (906) may be overloaded and accordingly there is a need to offload some of the terminals in the cell.

At step 924, cell C (906) may determine the need for offloading for load balancing. In one embodiment, if the load of the cell is greater than or equal to a preset value, offloading can be performed.

At step 926, among the terminals using cell C (906) as the PCell or the SCell, cell C (906) may select a terminal having a high PRB occupancy ratio as a candidate terminal for offloading. In this way, by offloading a terminal with a high PRB occupancy ratio to another cell, the overload situation of cell C (906) can be resolved by offloading a smaller number of terminals. In one embodiment, cell C (906) may select a candidate terminal for offloading based on the PRB occupancy ratio of each terminal. Here, terminal 2 (914), terminal 3 (916), and terminal 4 (918) may be selected as candidate terminals.

At step 928, cell C (906) may transmit information about the selected candidate terminals to cell B (904). More specifically, cell C (906) may transmit information about a terminal using cell B (904) as the PCell to cell B (904). For example, information about terminal 2 (914) may be transmitted. As such, by transmitting information about the terminal, a measurement report can be requested to the terminal using cell B (904) as the PCell and received therefrom.

At step 930, cell B (904) may transmit a measurement report request to terminal 2 (914) based on the information received at step 928.

At step 938, cell B (904) can request and receive SCell information of terminal 2 (914) using cell B (904) as the PCell. The SCell information may include information on the PRB occupancy ratio of terminal 2 (914) in cell C (906).

At step 940, cell B (904) may receive corresponding measurement information from terminal 2 (914). The measurement information may include information for offloading. For example, the measurement information may include information for determining whether the perceived performance is improved when the terminal is moved from one cell to another cell.

At step 944, cell B (904) may calculate an offloading value for terminal 2 (914) based on at least one of the information items received at steps 938 and 940. In one embodiment, cell B (904) may calculate the metric value for each CA combination not including the serving cell (overloaded cell) among all possible CA combinations for terminal 2 (914), and may select the largest one of the calculated metric values and the CA combination corresponding to the largest metric value.

At step 948, cell B (904) may transmit the information about terminal 2 (914) obtained at step 944 to cell C (906). In the embodiment, the calculation result for offloading is transmitted. However, the disclosure is not limited thereto. For example, cell B (904) may transmit parameters usable for calculating offloading values, and cell C (906) may calculate offloading values based on the parameters.

At step 932, cell C (906) may transmit a measurement report request to terminal 3 (916) and terminal 4 (918) using cell C (906) as the PCell. The measurement report request may include a request for the metric values described above. At step 942, cell C (906) may receive measurement report information from terminal 3 (916) and terminal 4 (918).

At step 934, to obtain SCell information of terminal 4 (918) using cell C (906) as the PCell, cell C (906) may transmit a SCell information request to cell B (904) and receive SCell information of terminal 4 (918) as a response. The SCell information may include information on the PRB occupancy ratio of terminal 4 (918) in cell B (904).

At step 936, to obtain SCell information of terminal 3 (916) and terminal 4 (918) using cell C (906) as the PCell, cell C (906) may transmit a SCell information request to cell D (908) and receive SCell information of terminal 3 (916) and terminal 4 (918) as a response. The SCell information may include information on the PRB occupancy ratios of terminal 3 (916) and terminal 4 (918) in cell D (908).

At step 946, the cell C (906) may calculate an offloading value for at least one of terminal 3 (916) or terminal 4 (918) based on at least one of the information items received at the steps 934, 936 and 942. In one embodiment, cell C (906)

may calculate the metric value for each CA combination not including the serving cell (overloaded cell) among all possible CA combinations for at least one of terminal 3 (916) or terminal 4 (918), and may select the largest one of the calculated metric values and the CA combination corresponding to the largest metric value.

At step 950, cell C (906) may finally determine a terminal to be offloaded among the candidate terminals for offloading based on at least one of the information items received at steps 946 and 948. In one embodiment, it is possible to select terminal 2 (914) and terminal 3 (916) with an optimal offloading value.

As the PCell of terminal 2 (914) is cell B (904), to indicate offloading, at step 952, cell C (906) may transmit a message indicating offloading of terminal 2 (914) to cell B (904). The message indicating offloading may include identification information of terminal 2 (914) and information on the target cell to which terminal 2 (914) is to be offloaded. In one embodiment, if identification information of terminal 2 (914) is included, cell B (904) may determine the cell to which terminal 2 (914) is to be offloaded based on the value calculated at step 944.

At step 954, cell B (904) may transmit a message indicating offloading to terminal 2 (914). The message indicating offloading may be an RRC message for changing the SCell of terminal 2 (914). According to the message, terminal 2 (914) may change the SCell from cell C (906) to the target cell.

At step 956, cell C (906) may transmit a message indicating offloading to terminal 3 (916). The message indicating offloading may be a message indicating a PCell change of terminal 3 (916). More specifically, the message indicating offloading may be a message directing a change of the PCell to a target cell, and may be a message indicating handover. Here, cell C (906) may include a list of candidate SCells for terminal 3 (916) in the message indicating handover. Based on the list information, the target PCell may further allocate a SCell.

In the above embodiment, steps 926 to 950 may be performed in a different order from that shown in the drawing. That is, when information for performing a specific operation is obtained, the operation may be performed regardless of the order of operations performed in other cells.

Figure 10:
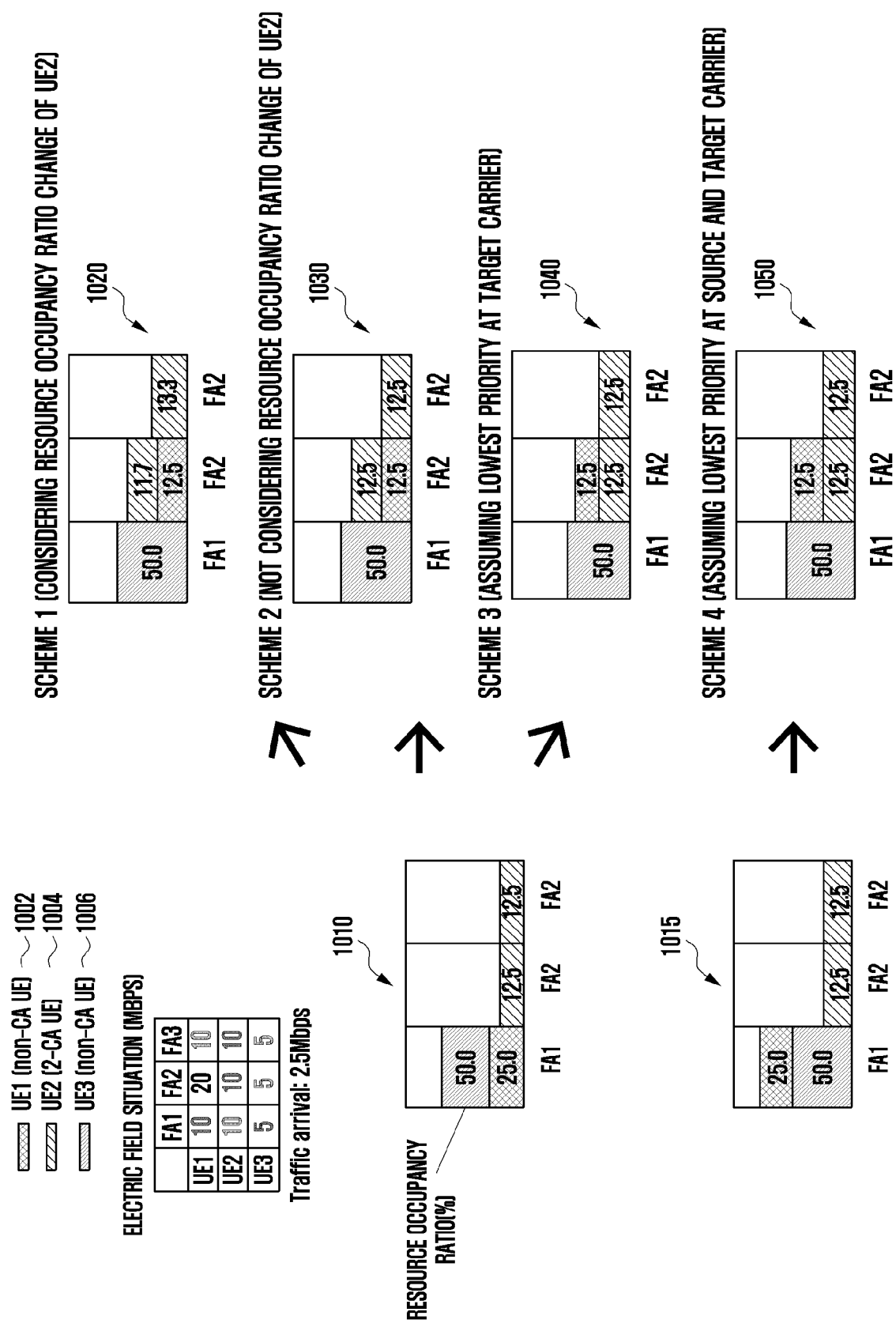
FIG. 10 illustrates schemes for improving the perceived performance according to an embodiment of the disclosure.

FIG. 10 illustrates schemes for improving the perceived performance according to an embodiment of the disclosure.

In FIG. 10, terminal 1 (1002), terminal 2 (1004), and terminal 3 (1006) may each transmit and receive signals through at least one of cell 1, cell 2, or cell 3. Terminal 1 (1002) communicates using cell 1 as the PCell, terminal 2 (1004) performs CA using cell 2 and cell 3, and terminal 3 (1006) communicates using cell 1 as the PCell. Here, the case of offloading terminal 1 (1002) from cell 1 to cell 2 is considered.

The electric field situation indicating the signal transmission and reception of the terminal in each cell may be represented as indicated by indicia 1008.

Indicia 1010 and 1015 indicate the resource occupancy ratios of the terminals in each cell before offloading. Indicia 1020 to 1050 indicate the resource occupancy ratios after offloading according to embodiments of the disclosure. For the resource shown below on the resource occupancy, scheduling importance may be high.

As indicated by indicia 1010, before offloading, terminal 1 (1002) has priority in cell 1 with a resource occupancy ratio of 25 percent. According to schemes 1 to 3 considering resource occupancy ratio changes and scheduling priority, offloading may be performed as follows.

In scheme 1, as indicated by indicia 1020, the degree of perceived performance improvement may be determined according to offloading in consideration of changes in resource occupancy of terminal 2 (1004). Here, there is no change in scheduling priority for terminal 1 (1002).

In scheme 2, as indicated by indicia 1030, the degree of perceived performance improvement may be determined according to offloading without consideration of changes in resource occupancy of terminal 2 (1004). Here, there is no change in scheduling priority for terminal 1 (1002).

In scheme 3, as indicated by indicia 1040, the degree of perceived performance improvement may be determined according to offloading without consideration of changes in resource occupancy of terminal 2 (1004). Here, the scheduling priority for terminal 1 (1002) may be assumed to be lowest in the target cell.

In scheme 4, the state indicated by indicia 1015 may be changed to the state indicated by indicia 1050. As indicated by indicia 1050, the degree of perceived performance improvement may be determined according to offloading without consideration of changes in resource occupancy of terminal 2 (1004). Here, for determining the perceived performance improvement, the scheduling priority for terminal 1 (1002) may be assumed to be lowest in the source cell and the target cell.

When going from scheme 1 to scheme 4 in sequence, the computational complexity decreases, but the accuracy may become relatively low.

Figure 11:
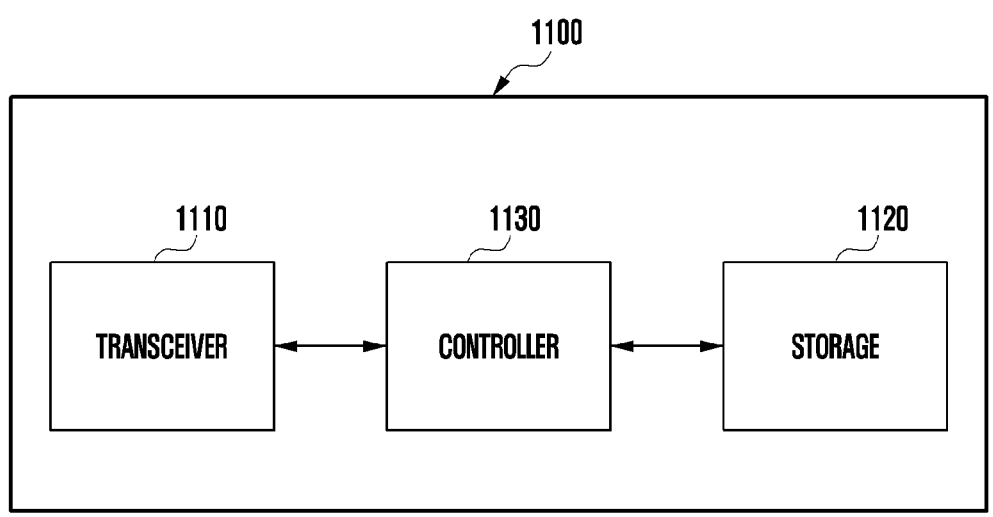
FIG. 11 is a block diagram of a base station according to an embodiment of the disclosure.

FIG. 11 is a block diagram of a base station according to an embodiment of the disclosure.

With reference to FIG. 11, in one embodiment, the base station 1100 includes a transceiver 1110, a storage 1120, and a controller 1130.

The transceiver 1110 may transmit and receive signals to and from a terminal and other network entities.

The storage 1120 may store at least one of information related to the base station 1100 or information transmitted and received through the transceiver 1110.

The controller 1130 may control the overall operation of the base station 1100, and may control the base station 1100 to perform base station operations described in the above embodiments. The controller 1130 may include at least one processor.

Figure 12:
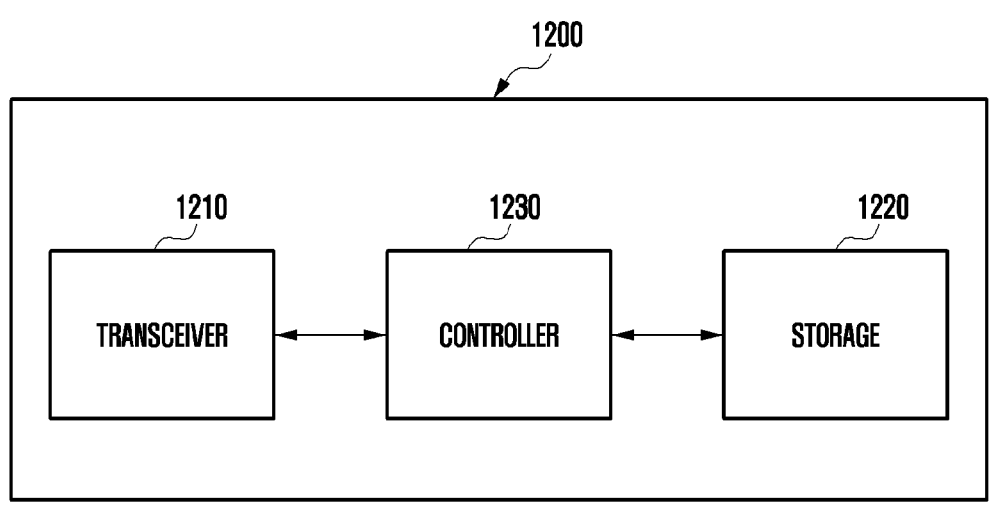
FIG. 12 is a block diagram of a terminal according to an embodiment of the disclosure.

FIG. 12 is a block diagram of a terminal according to an embodiment of the disclosure.

With reference to FIG. 12, in one embodiment, the terminal 1200 includes a transceiver 1210, a storage 1220, and a controller 1230.

The transceiver 1210 may transmit and receive a signal to and from a base station.

The storage 1220 may store at least one of information related to the terminal 1200 or information transmitted and received through the transceiver 1210.

The controller 1230 may control the overall operation of the terminal 1200, and may control the terminal 1200 to perform terminal operations described in the above embodiments. The controller 1230 may include at least one processor.

Hereinabove, embodiments of the disclosure have been described with reference to the accompanying drawings. Specific terms or words used in the description should be construed in accordance with the spirit of the disclosure without limiting the subject matter thereof. It should be understood that many variations and modifications of the basic inventive concept described herein will still fall within the spirit and scope of the disclosure as defined in the appended claims and their equivalents.

The invention claimed is:

1. A method for a base station to control terminals in a mobile communication system, the method comprising:
selecting one or more candidate terminals for offloading;
obtaining information for evaluating of an offloading validity;
identifying a degree of throughput improvement obtained by offloading at least one terminal among the one or more candidate terminals to a neighbor cell, based on the information, wherein the offloading validity is evaluated based on the identifying of the degree of throughput improvement;
selecting a target terminal to be offloaded among the one or more candidate terminals based on the evaluating of the offloading validity; and
transmitting, to the target terminal, a message indicating that the target terminal is offloaded to a target cell,
wherein among the one or more candidate terminals, a terminal using a cell corresponding to the base station as a secondary cell (SCell) has a higher priority than a terminal using the cell corresponding to the base station as a primary cell (PCell), and
wherein the selecting of the target terminal depends on the priority.

2. The method of claim 1, further comprising:
receiving load information of each cell including information for a sum of physical resource block (PRB) utilization for each cell; and
determining whether a cell corresponding to the base station is overloaded.

3. The method of claim 1, wherein in case that the target terminal is using a cell corresponding to the base station as the SCell, the message is transmitted to the target terminal through a base station corresponding to the PCell of the target terminal.

4. The method of claim 1, wherein a terminal whose degree of throughput improvement is greater than or equal to a preset value is selected as the target terminal, and
wherein the one or more candidate terminals are selected in order of physical resource block (PRB) occupancy ratio from highest in a cell corresponding to the base station.

5. The method of claim 1, wherein the degree of throughput improvement is determined based on at least one of a change in resource occupancy of the at least one terminal or a scheduling priority for the at least one terminal.

6. The method of claim 1, wherein the degree of throughput improvement is determined based on an assumption that a scheduling priority for the at least one terminal is lowest in a cell corresponding to the base station and in the neighbor cell.

7. The method of claim 1, further comprising:
transmitting information for at least one terminal among the one or more candidate terminals.

8. The method of claim 1, wherein in case that the at least one terminal selects a cell corresponding the base station as the PCell, the obtaining of the information for evaluating of the offloading validity comprises:
transmitting, to the at least one terminal, a request of a measurement report; and
receiving, from the at least one terminal, the measurement report.

9. The method of claim 8, wherein in case that the at least one terminal selects the cell corresponding the base station as the PCell, the obtaining of the information for evaluating of the offloading validity comprises:
transmitting a request for information related to the SCell of the at least one terminal, to a base station corresponding to the SCell; and
receiving, from the base station corresponding to the SCell, information related to the SCell.

10. The method of claim 1, wherein the information for evaluating of the offloading validity includes at least one of a physical resource block (PRB) occupancy ratio or an average signal to interference and noise ratio (SINR) for the at least one terminal in the neighbor cell.

11. The method of claim 1, further comprising:
selecting the target cell to which the target terminal is offloaded.

12. A base station in a mobile communication system, comprising:
a transceiver configured to transmit and receive a signal; and
a controller configured to:
select one or more candidate terminals for offloading,
obtain information for evaluating of an offloading validity,
identify a degree of throughput improvement obtained by offloading at least one terminal among the one or more candidate terminals to a neighbor cell, based on the information, wherein the offloading validity is evaluated based on the identifying of the degree of throughput improvement,
select a target terminal to be offloaded among the one or more candidate terminals based on the evaluating of the offloading validity, and
transmit, to the target terminal, a message indicating that the target terminal is offloaded to a target cell corresponding to the target terminal to the target terminal,
wherein among the one or more candidate terminals, a terminal using a cell corresponding to the base station as a secondary cell (SCell) has a higher priority than a terminal using the cell corresponding to the base station as a primary cell (PCell), and
wherein the controller is configured to select the target terminal depending on the priority.

13. The base station of claim 12, wherein the controller is configured to:
receive load information of each cell including information for a sum of physical resource block (PRB) utilization for each cell, and
determine whether a cell corresponding to the base station is overloaded.

14. The base station of claim 12, wherein, in case that the target terminal is using a cell corresponding to the base station as the SCell, the controller is configured to transmit, to the target terminal, the message through a base station corresponding to the PCell of the target terminal.

15. The base station of claim 12, wherein, a terminal whose degree of throughput improvement is greater than or equal to a preset value is selected as the target terminal, and
wherein the one or more candidate terminals are selected in order of physical resource block (PRB) occupancy ratio from highest in a cell corresponding to the base station.

16. The base station of claim 12, wherein the degree of throughput improvement is determined based on at least one of a change in resource occupancy of the at least one terminal or a scheduling priority for the at least one terminal.

17. The base station of claim 12, wherein the degree of throughput improvement is determined based on an assumption that a scheduling priority for the at least one terminal is lowest in a cell corresponding to the base station and in the neighbor cell.

* * * * *